March 14, 1967  E. F. GYGAX  3,308,739
PITLESS AIR SCREEN
Filed Aug. 27, 1964  2 Sheets-Sheet 1
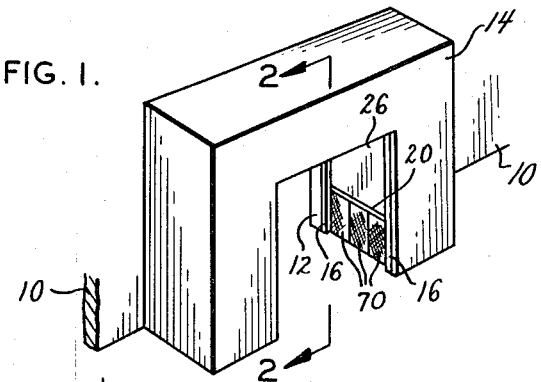
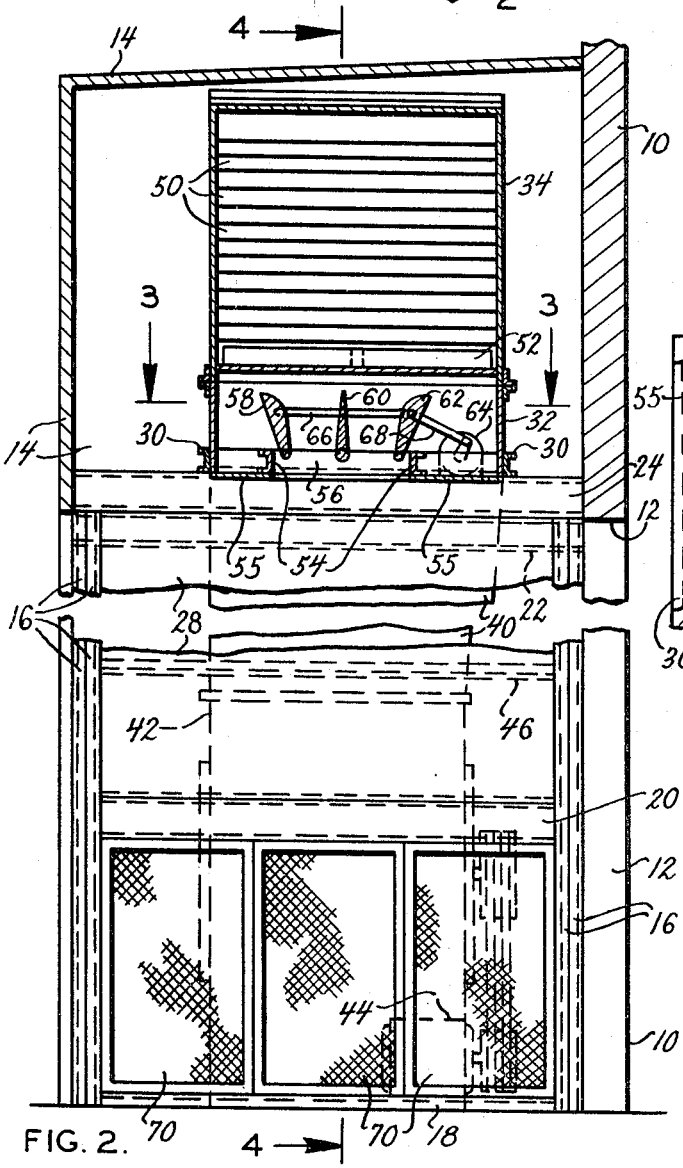
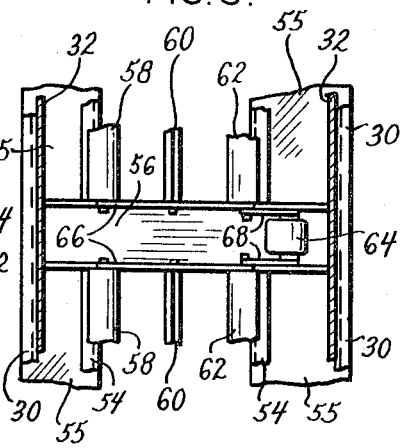

United States Patent Office 3,308,739
Patented Mar. 14, 1967

3,308,739
PITLESS AIR SCREEN
Ernest F. Gygax, Glendale, Mo., assignor to Universal Match Corporation, Ferguson, Mo., a corporation of Delaware
Filed Aug. 27, 1964, Ser. No. 392,569
2 Claims. (Cl. 98—36)

This invention relates to improvements in air screens. More particularly, this invention relates to improvements in structures which can develop air screens adjacent the doorways of buildings.

It is, therefore, an object of the present invention to provide an improved structure which can develop an air screen adjacent the doorway of a building.

It is frequently desirable to establish and maintain an air screen adjacent the doorway of a building. Such an air screen permits the doors of the building to remain open during business hours, thereby facilitating full and free access into, and full and free egress from, the building. Moreover, the air screen minimizes the creation of objectionable drafts and minimizes the loss of heat from the building. One structure that has been very useful in developing air screens is shown and described in Steiner Patent No. 2,863,373 for Device for Producing a Room-Closing Air Curtain, which was granted December 9, 1958. That structure included a plenum chamber, a pit, a duct which extended between the pit and the plenum chamber, air-guiding members disposed in the air-discharging opening of the plenum chamber, a mechanism to adjust the position of those air-guiding members, and a blower to move air past the air-guiding members across the opening to be protected, through the pit, and then back through the duct to the plenum chamber.

Structures of the type disclosed in the said patent are extremely useful and beneficial, and they have been exceptionally satisfactory in service. However, in some cases, it is highly uneconomic to provide a pit as part of the structure for establishing and maintaining the air screen. For example, where the structure is to maintain an air screen adjacent a doorway through which a railroad spur extends, the cost of making a pit with sufficient support therein for the rails of the spur is uneconomic. Consequently, it would be desirable to provide a structure that could establish and maintain an air screen adjacent a doorway and which would not require a pit. The present invention provides such a structure; and it is, therefore, an object of the present invention to provide a structure which does not have a pit but which can establish and maintain an air screen adjacent a doorway.

The present invention makes it possible to establish an air screen adjacent a doorway and yet not have a pit for the structure which establishes and maintains that air screen by providing a vertically-directed air duct at each side of the opening and by providing an air-intake opening in the lower ends of the confronting faces of those air ducts. These air ducts extend up to and communicate with the opposite ends of a plenum chamber which is mounted above the doorway, and the ducts draw in air which is directed downwardly against the floor below the plenum chamber. As a result, a circulation of air will be effected downwardly across the doorway, and the resulting screen of air will effectively provide the desired isolation of the interior of the building from the exterior atmosphere. It is, therefore, an object of the present invention to provide vertically-directed air ducts adjacent the opposite sides of a doorway, to provide a plenum chamber to which the upper end of the air ducts extend, and to provide air inlet openings in the lower ends of the confronting faces of those air ducts.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

In the drawing,

FIG. 1 is a perspective view of one preferred embodiment of pitless structure for establishing and maintaining an air screen adjacent a doorway.

FIG. 2 is a broken vertical section, on a much larger scale, through the structure of FIG. 1, and it is taken along the plane indicated by the line 2—2 in FIG. 1.

FIG. 3 is a sectional view through a portion of the structure shown in FIG. 2, and it is taken along the plane indicated by the line 3—3 in FIG. 2.

FIG. 5 is a sectional view through a part of the structure shown in FIG. 4, and it is taken along the broken plane indicated by the broken line 5—5 in FIG. 4.

Figure 4:
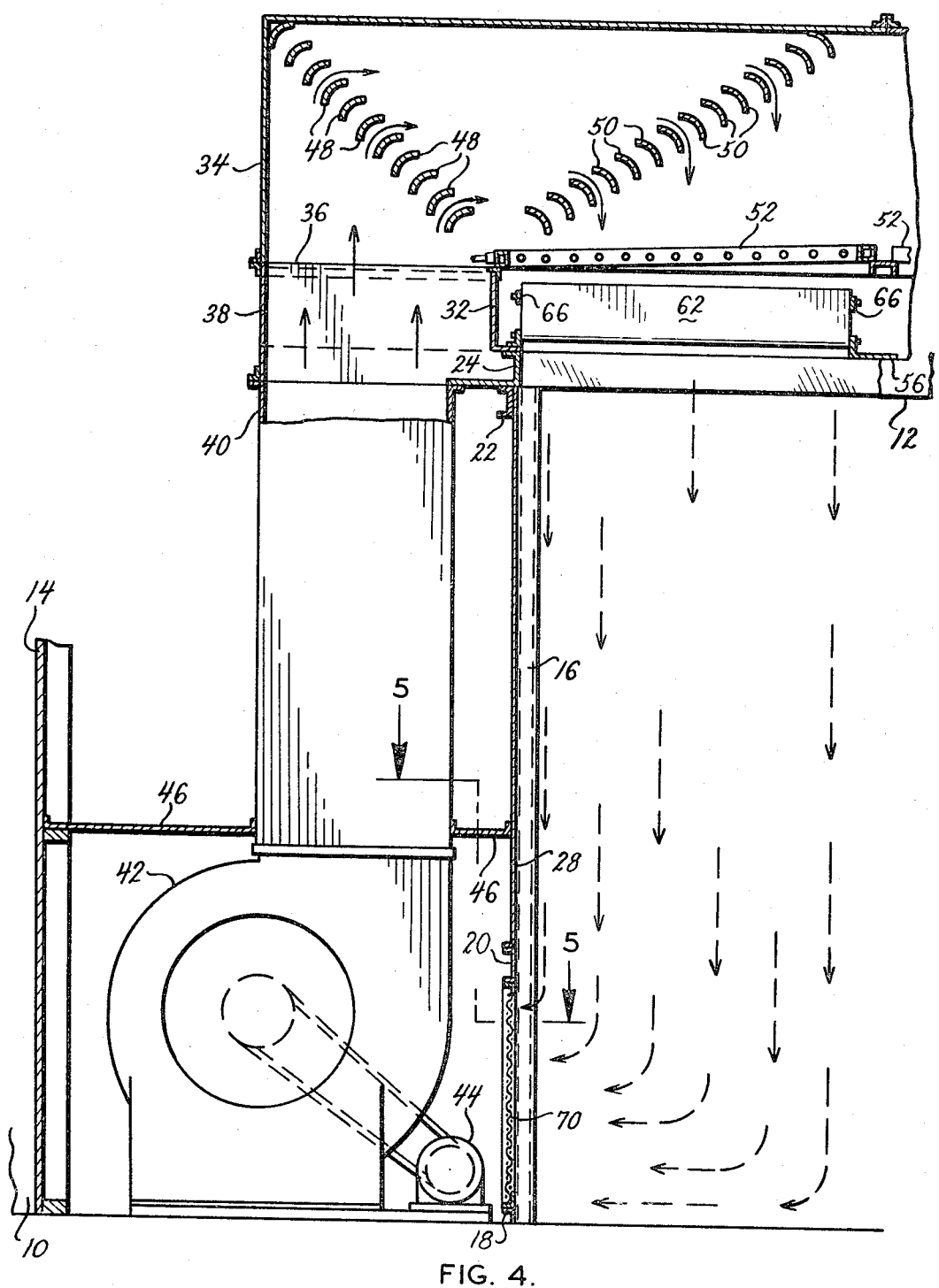
FIG. 4 is a partially broken away sectional view, on a still larger scale, through the structure shown in FIG. 2, and it is taken along the plane indicated by the line 4—4 in FIG. 2.

Referring to the drawing in detail, the numeral 10 denotes a wall of a building, and the numeral 12 denotes a doorway in that wall. An enclosure 14 of neat and functional design is mounted at one side of the wall 10 immediately adjacent the doorway 12. That enclosure has a front wall which generally resembles an inverted U, it has a top which extends from that front wall to the wall 10, and it also has side walls which extend from that front wall to the wall 10.

The numeral 16 denotes vertically-directed frame members; and, as shown particularly by FIG. 5, those frame members can be made by butting the flanges of channels. A frame member 16 is secured to the wall 10 adjacent each side of the doorway 12, and two further frame members 16 are disposed adjacent the opening in the front wall of the enclosure 14, as best shown in FIGS. 1 and 2. An angle 18 extends between the bottoms of the frame members 16 at one side of the doorway 12, as shown by FIGS. 2 and 4; and a similar angle extends between the bottoms of the frame members 16 adjacent the opposite side of that doorway. A channel 20 extends between the frame members 16 at one side of the doorway 12, as shown by FIGS. 1, 2 and 4; and a second channel extends between the frame members 16 adjacent the opposite side of that doorway. The channels 20 are located between about one-quarter and one-third of the distance between the bottoms and the tops of the frame member 16. A channel 22 is secured to the upper ends of the frame members 16 adjacent one side of the doorway 12, as shown by FIGS. 2 and 4; and a further channel 22 is secured to the tops of the frame members 16 adjacent the opposite side of that doorway. A rectangular frame 24, which is preferably made from channels is secured to the tops of the frame members 16, as shown by FIGS. 2 and 4. The angles 18, the channels 20, the channels 22, and the rectangular frame 24 coact with the frame members 16 to provide a strong and sturdy frame for the structure which is to develop and maintain an air screen adjacent the doorway 12.

The numeral 26 denotes a wall which is secured to and which spans the space defined by the frame members 16 and the channels 20 and 22 adjacent one side of the doorway 12, as shown particularly by FIG. 1. The numeral 28 denotes a similar wall which is secured to and which spans the space defined by the frame members 16 and the channels 20 and 22 adjacent the opposite side of that doorway. Channels 30 are secured to and rest upon the elongated sides of the frame 24, as shown by FIG. 2. A rectangular discharge outlet 32 is provided for a plenum chamber 34, and that rectangular discharge outlet has the lower end thereof abutting the confronting faces of the channels 30, as shown by FIG. 2. The plenum chamber 34 extends horizontally outwardly beyond the ends of the frame 24, as shown by FIG. 4; and openings 36, having downwardly-directed extensions 38, are provided in those portions of the plenum chamber which project outwardly beyond the frame 24. Blowers 42 are provided at opposite sides of the doorway 12; and one of those blowers is shown in FIGS. 2 and 4. Ducts 40 extend upwardly from the outlet ports of the multivane blowers 42; and the upper ends of those ducts communicate with the extensions 38 of the openings 36 in the plenum chamber 34. The multi-vane blowers 42 are driven by electric motors 44; and one of those motors is shown in FIGS. 2 and 4. Horizontal partitions 46 extend between the end walls of the enclosure 14 and the walls 28 and 26; and one of those partitions is shown in FIGS. 2 and 4. Those partitions constitute the tops of the "boxes" for the multi-vane blowers 42.

Turning vanes 48 are disposed within the plenum chamber 34 in register with the ducts 40, and one group of those turning vanes is shown in FIG. 4. Further turning vanes 50 are disposed within the plenum chamber 34; and those turning vanes are in register with the rectangular discharge outlet 32 of that plenum chamber. The turning vanes 48 will cause air moving upwardly from the ducts 40 to turn and move horizontally toward the longitudinal center of the plenum chamber 34; and the turning vanes 50 will cause that air to turn and move vertically downwardly toward the rectangular discharge outlet 32 of that plenum chamber.

Heat-exchanging units 52 are mounted adjacent the rectangular discharge outlet 32 of the plenum chamber 34, and one of those units is shown in FIGS. 2 and 4. Those units can be finned coils; and they can be used to heat the air in the winter and to cool the air in the summer. Channels 54 and plates 55 coact with the rectangular frame 24 to define the discharge opening of the rectangular discharge outlet 32 of the plenum chamber 34. A supporting channel 56 extends transversely of the channels 54 and of the discharge opening; and vanes 58, 60 and 62 have the lower ends thereof pivoted to that channel. The vanes 58 and 62 have configurations which resemble the configuration of airfoils, while the vane 60 generally resembles a narrow parallelepiped of triangular cross-section. Connecting rods 66 are pivoted to the vanes 58, 60 and 62 adjacent the upper ends of those vanes, and further connecting rods 68 extend between the vane 62 and crank arms carried by the shaft of a motor 64 which is supported on the channel 56. Rotation of the crank arms of the motor 64 can cause the vanes 58, 60 and 62 to rotate in the clockwise or counterclockwise direction about the pivots which secure them to the channel 56. A suitable control mechanism, not shown, will be provided to operate the motor 64.

The numeral 70 denotes screens which have sturdy frames; and those screens are mounted intermediate the angles 18 and the channels 20 at both sides of the doorway 12. Those screens lie in the planes defined by the walls 26 and 28; and they coact with those walls to serve as the confronting faces of the passage through the enclosure 14.

FIG. 4 emphasizes the left-hand half of the structure which is provided to establish and maintain an air screen adjacent the doorway 12. The other half of that structure will be a mirror-image of the structure shown in FIG. 4.

Operation

In the operation of the structure shown by the drawing, the motors 44 will drive the rotors of the multi-vane blowers 42; and those blowers will draw air inwardly through the screens 70 and force that air to move upwardly through the air ducts 40. That air will pass through the extensions 38 of the openings 36 in the plenum chamber and enter that plenum chamber at the opposite ends of that plenum chamber. As that air approaches the turning vanes 48, that air will be caused to turn from its vertical direction to the horizontal direction so it will move toward the longitudinal center of that plenum chamber. As the air approaches the turning vanes 50, that air will be caused to turn and move downwardly through the heat-exchanging units 52 and into the rectangular discharge outlet 32 of the plenum chamber 34. The vanes 58, 60 and 62, which are disposed within that rectangular discharge opening of that discharge outlet, will guide the air as it moves downwardly through that rectangular discharge outlet and through the discharge opening of that discharge outlet. That air will then move generally downwardly, as indicated by the arrows in FIG. 4, until it passes below the levels of the channels 20. Thereafter, part of that air will move to the left and pass through the screens 70 shown in FIG. 4, another part of that air will move to the right and pass through the screens 70 shown in FIG. 1, some of that air will pass inwardly of the opening 12, while the rest of that air will pass outwardly of the opening 12 and outwardly of the passage through the enclosure 14. The amount of air that passes inwardly of the doorway 12 and the amount of air which passes outwardly of that doorway and outwardly of the passage through the enclosure 14 can be regulated to some extent by the setting of the vanes 58, 60 and 62. Specifically, when the vanes 58, 60 and 62 are inclined inwardly of the doorway 12, only a small amount of air will pass outwardly of that doorway and outwardly of the passage through the enclosure 14; and more of the air will pass inwardly of the doorway 12. The multi-vane blowers 42 will be operated at a sufficiently high rate of speed to establish a high velocity for the air passing downwardly through the discharge opening of the discharge outlet 32; and, where that is done, the amount of air which is drawn into the screens 70 at the opposite sides of the doorway will be substantially greater than the amount of air which passes inwardly through the doorway 12 and which passes outwardly of that doorway and outwardly of the passage through the enclosure 14.

It will be noted that the air which moves downwardly through the discharge opening of the discharge outlet 32 passes between two unbroken, air-impervious walls 26 and 28 until after that air has moved downwardly a distance between two-thirds and three-quarters of the overall height of the doorway. Thereafter, that air is drawn laterally through the screens 70 into the "boxes" for the multi-vane blowers 42; and then the air is directed upwardly through the ducts 40 into the plenum chamber 34. The air is moved with such a high velocity that it will fill the entire area between the walls 26 and 28 and between the screens 70 and will substantially prevent drafts through the doorway 12. Because a pit is not provided for the air which passes downwardly across the doorway, some air will pass inwardly through the doorway 12 and some air will pass outwardly of that doorway and outwardly of the passage through the enclosure 14. However, the amount of air which is thus lost does not objectionably increase the cost of operating the air screen.

Whereas the drawing and accompanying description have shown and described a preferred embodiment of the present invention, it should be apparent to those skilled in the art that various changes may be made in the form of the invention without affecting the scope thereof.

What I claim is:

1. A pitless structure for maintaining an air screen adjacent a doorway opening which can act as a barrier and substantially keep drafts of air from passing through said doorway opening and which comprises:
   (a) a vertically-directed air duct adjacent one side of said opening.

(b) a second vertically-directed air duct adjacent the opposite side of said opening,
(c) a plenum chamber adjacent the top of said opening,
(d) the upper ends of said air ducts extending to and communicating with the ends of said plenum chamber,
(e) an opening in the lower end of that face of the first said air duct which confronts said second air duct,
(f) an opening in the lower end of that face of said second air duct which confronts the first said air duct,
(g) said openings being immediately adjacent the bottom of said doorway opening.
(h) air-guiding elements within the discharge opening of said plenum chamber which can guide air passing outwardly through said discharge opening into the form of a barrier-like air screen moving downwardly toward the bottom of said opening, and
(i) an air moving device which can cause air to enter said openings in said faces of said air ducts, to pass upwardly through said air ducts and enter said plenum chamber, and to pass outwardly through said discharge opening and past said air-guiding members into said doorway opening with sufficient velocity to form a barrier-like air screen that extends substantially from side to side and from the top to to substantially the bottom of said doorway opening,
(j) some of said air being drawn back into said openings in said confronting faces of said air ducts for recirculation across said doorway opening as part of said air screen, and
(k) said bottom of said doorway opening being substantially imperforate so said discharge opening of said plenum chamber confronts a substantially imperforate surface.
(l) said discharge opening of said plenum chamber and said air-guiding members limiting the depth of said air screen, in the direction of traffic passing through said doorway opening, to a value smaller than the depth, in the direction of traffic passing through said doorway opening, of said openings in said faces of said air ducts,
(m) whereby said air screen increases in depth as it moves from said top of said doorway opening to said bottom of said doorway opening.
(n) said pitless structure recirculating enough air across said doorway opening to enable said air screen to be substantially continuous, and to act as a barrier, across said doorway opening.

2. A pitless structure for maintaining an air screen adjacent a doorway opening which can act as a barrier and substantially keep drafts of air from passing through said doorway opening and which comprises:
(a) a vertically directed air duct adjacent one side of said opening,
(b) a second vertically directed air duct adjacent the opposite side of said opening,
(c) both said air ducts terminating above the ground level and extending therefrom to the top of said opening,
(d) plenum chamber adjacent the top of said opening,
(e) the upper ends of said air ducts extending to and communicating with said plenum chamber,
(f) an opening in the lower end of that face of the first said air duct which confronts said second air duct,
(g) an opening in the lower end of that face of said second air duct which confronts the first said air duct,
(h) said openings being immediately adjacent the bottom of said doorway opening,
(i) air-guiding elements within the discharge opening of said plenum chamber which can guide air passing outwardly through said discharge opening into the form of a barrier-like air screen moving downwardly toward the bottom of said opening, and
(j) an air moving device which can cause air to enter said openings in said faces of said air ducts, to pass upwardly through said air ducts and enter said plenum chamber, and to pass outwardly through said discharge opening and past said air-guiding members into said doorway opening with sufficient velocity to form a barrier-like air screen that extends substantially from side to side and from the top to substantially the bottom of said doorway opening,
(k) some of said air being drawn back into said openings in said confronting faces of said air ducts for recirculation across said doorway opening as part of said air screen, and
(l) said discharge opening of said plenum chamber and said air-guiding members limiting the depth of said air screen, in the direction of traffic passing through said doorway opening, to a value smaller than the depth, in the direction of traffic passing through said doorway opening, of said openings in said faces of said air ducts,
(m) whereby said air screen increases in depth as it moves from said top of said doorway opening to said bottom of said doorway opening.

References Cited by the Examiner
UNITED STATES PATENTS

| | | | |
|---|---|---|---|
| 1,750,774 | 3/1930 | Fahlstrom | 98—115 |
| 2,754,746 | 7/1956 | O'Brien | 98—36 |
| 2,955,521 | 10/1960 | Kurek | 98—36 |
| 3,113,501 | 12/1963 | Cargo | 98—36 |

FOREIGN PATENTS

| | | |
|---|---|---|
| 247,293 | 10/1963 | Australia. |
| 567,039 | 9/1957 | Italy. |

ROBERT A. O'LEARY, *Primary Examiner.*
W. E. WAYNER, *Assistant Examiner.*